Aug. 11, 1953    F. GEYER    2,648,789
LIQUID-COOLED ROTARY ELECTRIC MACHINE
Filed Nov. 7, 1951    2 Sheets-Sheet 1

*INVENTOR.*
Franz Geyer
BY
ATTORNEY

Aug. 11, 1953 F. GEYER 2,648,789
LIQUID-COOLED ROTARY ELECTRIC MACHINE
Filed Nov. 7, 1951 2 Sheets-Sheet 2
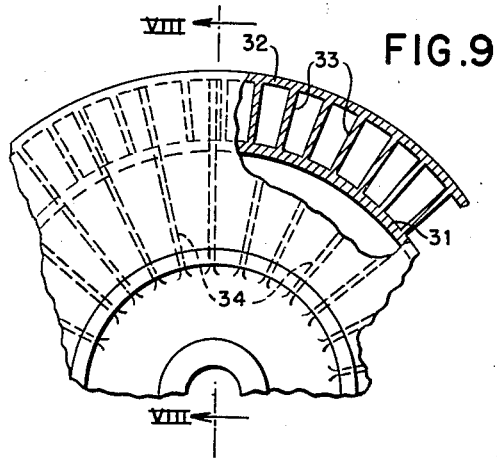
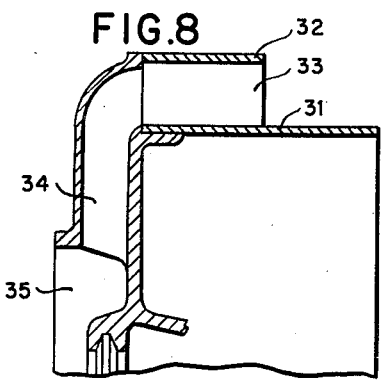
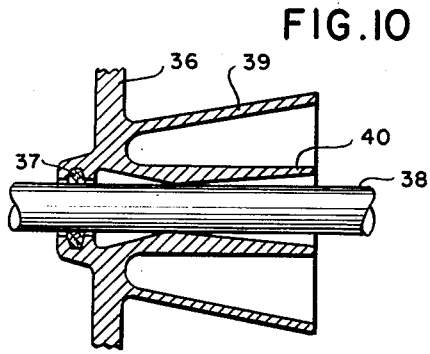
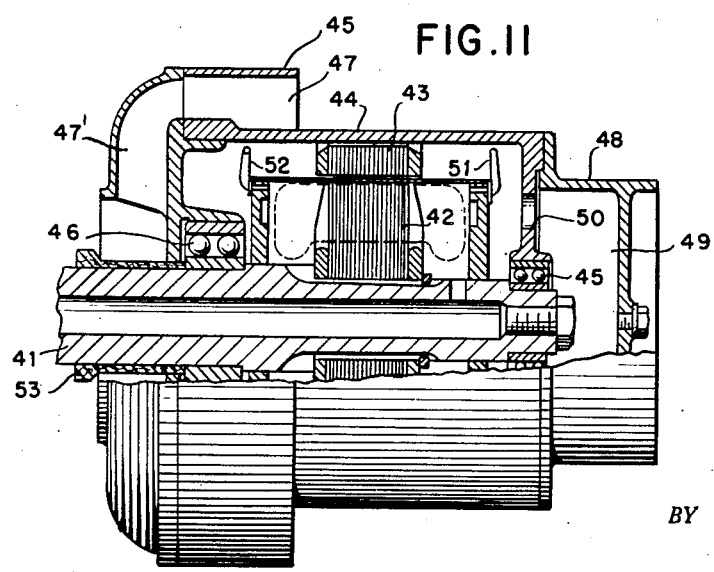
INVENTOR.
Franz Geyer
BY
ATTORNEY Patented Aug. 11, 1953

2,648,789

UNITED STATES PATENT OFFICE 2,648,789

LIQUID-COOLED ROTARY ELECTRIC MACHINE

Franz Geyer, Linz (Danube), Austria, assignor of one-half to Wilhelm F. Gauster, Raleigh, N. C.

Application November 7, 1951, Serial No. 255,299
In Austria January 27, 1950

11 Claims. (Cl. 310—54)

My invention relates to rotating electric machines such as motors and generators.

As a rule, the conventional machines of this kind are air cooled, closed-cycle hydrogen cooling being provided only for large machines requiring a more effective heat dissipation. Past attempts at cooling rotary electric machines by liquid remained essentially within experimental stages or were limited to exceptional applications. For instance, a known liquid-cooled split-phase converter has an exterior line-energized stator equipped with oil circulation cooling, while the pertaining rotor, located within the stator, is water cooled. Salient disadvantages of this machine are the necessity of providing extraneous apparatus for maintaining the oil circulation as well as the fact that the stator bore must be sealed toward the stator interior by structure extending through the air gap. The sealing structure must be liquid-tight and is required to be non-conductive electrically and magnetically while having satisfactory mechanical strength, any leak resulting in loss of cooling liquid.

As far as small electric machines such as standard motors are concerned, all attempts at liquid cooling have so far failed to gain application in actual practice.

It is therefore an object of my invention to devise liquid-cooled rotary electric machines that avoid the deficiencies of the known proposals and hence are suitable for any desired applications, for instance, as general-purpose motors including those of the smaller ratings.

Another, related object of my invention is to improve the cooling intensity in rotary electric machines in such a manner that advantage can be taken of the then available better utilization of the machine materials by reducing the total weight, size or cost of the machine.

Still another object of my invention is to greatly lessen in liquid-cooled rotary electric machines the requirements for tight liquid seals between stationary and revolvable machine elements, and particularly to reduce or virtually eliminate all liquid pressure acting during the machine rotation on any exterior gaps or seals.

The means provided in accordance with my invention for achieving these objects are described in the following with reference to the drawings in which:

Fig. 8 is an axial sectional view of part of a modified rotor housing for a machine according to the invention, the section being taken along the line VIII—VIII in Fig. 9; and the left-hand portion of Fig. 9 shows a fragmentary view of the same rotor housing seen from the left of Fig. 8 partially broken away;

Fig. 10 shows an axial sectional view of a shaft seal applicable in machines according to the invention; and Fig. 11 is a part-sectional view of another machine according to the invention.

Figure 6:
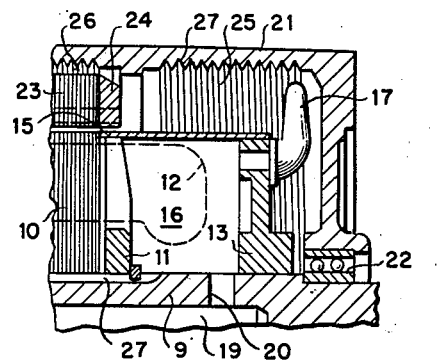

While the machines illustrated in Figs. 6 and 11 are designed as squirrel cage motors, the invention, of course, is similarly applicable for other rotary electric machines. In all illustrated machines, according to a requirement of the invention, the outer machine portion is rotatable and the inner portion is stationary so that the customary position of stator and rotor appears reversed. Such machine designs are known as such, for instance, for outside-pole generators or inside-out motors.

Figure 1:
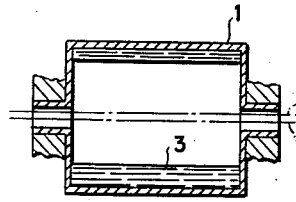
Figs. 1 and 2 are explanatory and show schematically an axial section and a cross section, respectively, of a horizontally journalled rotor with an enclosed quantity of cooling liquid during revolution of the rotor.
Figure 2:
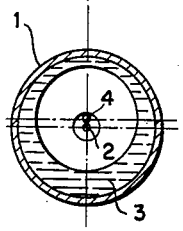
Figure 3:
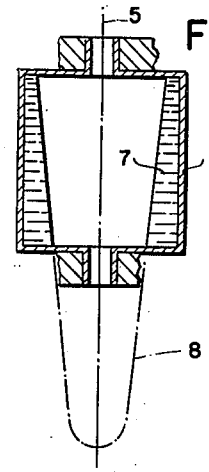
Fig. 3 is also explanatory, showing a schematical and axially sectional view of a revolving, vertically journalled rotor with an enclosed quantity of cooling liquid.

Now, according to a feature of my invention, I dispose in the interior of such a machine a quantity of cooling liquid so dimensioned that, during the operation of the machine, a free liquid surface, generally a rotational surface, will adjust itself due to centrifugal force acting upon the body of liquid. Thus, as exemplified by Figs. 1 and 2, showing schematically a hollow rotor 1 revolving about a horizontal axis 2 and containing a quantity of liquid 3, the free inner surface of the enclosed liquid during revolution of the rotor is a cylinder whose axis 4 is slightly displaced in a vertical plane relative to the machine axis 2. When the machine axis, such as the axis 5 of the hollow rotor 6 shown in Fig. 3, is vertical, the contour line of the free surface of the enclosed revolving body of liquid 7 defines a parabola 8.

In accordance with the invention, and regardless of the direction of the machine axis, the quantity of liquid enclosed in the machine rotor has an amount at which the diameter of the free surface of the revolving body of liquid is larger than the diameter of the machine bore, preferably by an only slight margin of safety. This basic design according to the invention has the immediate consequence of obviating the necessity of providing liquid-tight structural parts passing through the machine bore, thus eliminating a cause of severe complication inherent in the liquid-cooled rotary electric machines heretofore proposed.

According to another feature of my invention, a machine of the basic design just described is further equipped with tubular duct members, preferably located near the axial end walls of the machine housing, which enter into the rotating body of liquid and branch off from this body a flow of cooling liquid passing through machine portions otherwise out of contact with the revolving liquid body. The two duct members have their open ends directed against the direction of rotation and opposed thereto, respectively, so that one duct member scoops a flow of liquid from the revolving body while the other discharges this flow back into the body.

Figure 4:
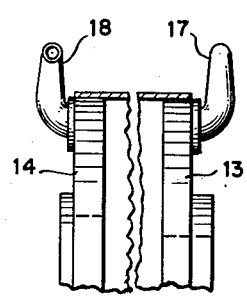
Figs. 4 and 5 show, respectively, a lateral view and a front view of part of a machine according to the invention, this machine being more fully illustrated in Fig. 6 by an axially sectional view of a portion of its stator and rotor.
Figure 5:
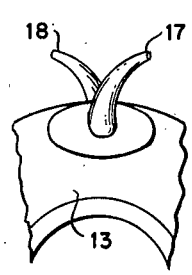

The just-mentioned features of the invention are embodied in the machine illustrated by Figs. 4 to 6. The machine has a stationary shaft 9 which carries a stack of laminations 10 pertaining to the field structure of the machine. The laminations are bordered at each axial side by a rigid disk member 11 also firmly secured to the shaft 9. The laminations 10 and the end disks 11 are slotted to receive the field windings of which one is schematically indicated in Fig. 6 by a broken line 12. The space occupied by the end turns of these windings is axially bordered by end disks 13 and 14, which together with respective peripheral sheet members 15 form at each side of the field structure a cap structure with a chamber 16 for the reception of cooling liquid. Each sheet member 15 extends from the disk member 13 or 14 to the adjacent end of the stack 10 so that the air gap of the machine is not obstructed by the cap structure.

The end disk 13 is equipped with a tubular duct member 17 which projects radially from the disk. The duct member communicates with the chamber 16 and is bent in the peripheral direction. The end disk 14 at the other axial side of the stationary machine structure is provided with a similar duct member 18, which, however, is bent in the opposite peripheral direction.

The shaft 9 has an axial bore 19 connected through a lateral hole 20 with the winding space of the field structure. The machine cables (not shown) for energizing the windings pass through bore 19 and hole 20. The bore is plugged to prevent an escape of liquid from chamber 16.

The rotor structure 21 of the machine is designed as a housing which encloses the above-described stator structure and is journalled on the stationary shaft 9, for instance, by antifriction bearings such as the ball bearing shown at 22. The rotor housing 21 carries in its interior a stack of laminations 23 equipped with a squirrel-cage winding.

The space 25 within the rotor housing 21 is provided with a quantity of cooling liquid such as oil so that, during the operation of the machine at normal speed, a cylindrical liquid body of rotation is established in each space 25 as explained in the foregoing with reference to Figs. 1 and 2. During rotation, the open ends of the tubular duct members 17 and 18 are submerged in the rotating body of liquid. Consequently, one of the tubular extensions continuously scoops a flow of liquid from the rotating liquid body into the adjacent chamber 16. The chamber 16 need not be absolutely sealed against the surrounding space of the rotor structure because any leakage simply returns into the rotating main body of liquid and hence is not wasted, this being another essential advantage of the invention.

The liquid thus forced into one of the chambers 16 passes through the winding slots of the stator structure to the chamber 16 at the other side of the machine, whence it is discharged through the other duct member back into the main body of liquid. Such a flow of liquid is readily possible because of the more or less capillary interstices always present between the individual conductors in each stator slot. Consequently, the flow of cooling liquid involves practically and directly each individual conductor within the slots and thus affords operating at a much higher current intensity as is applicable with air-cooled machines, aside from the fact that in air-cooled machines a flow of coolant in the axial direction through the slots has so far been used only in exceptional cases and only for large size machines.

Figure 7:
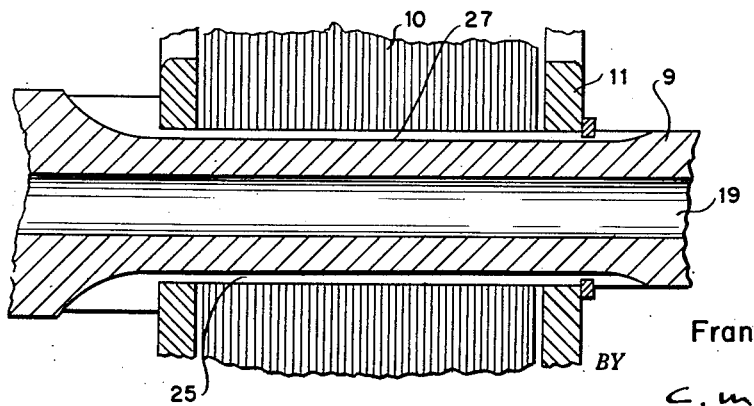
Fig. 7 shows an axial section through the shaft and the adjoining stator laminations of the machine according to Figs. 4 to 6.

In order to secure a more effective cooling of the conductor portions in the end turns of the windings, the total amount of liquid diverted through the stator structure can be increased by the additional provision of a flow parallel to that passing through the winding slots. To this end, the machine is equipped with bypass ducts, for instance, one or several grooves 27 along the shaft 9 (Figs. 6 and 7) or similar axial grooves in the bore of the stack of stator laminations. The increase in the amount of circulating liquid has also the favorable effect of diminishing the temperature differences along the path of flow.

It will be understood from the foregoing that the described design provides an effective cooling not only of the rotor containing the main body of liquid, but also secures a similarly effective circulation cooling of the stator. The opposed and symmetrical arrangement of the scooping and discharging duct members 17 and 18 renders the cooling operation independent of the direction of rotation. When the rotation is reversed, the scooping and discharging tubes simply reverse their respective functions. As mentioned, the two tubular members are preferably given a symmetrical design so that the cooling effects are virtually the same for both directions of rotation. The shape of the tubular ducts is preferably such that the impact losses at the scooping tube are as small as possible, while the gain in flow energy at the discharging tube is as large as possible. Aside from the above mentioned losses, the energy requirements for maintaining the flow of cooling liquid are determined only by the equivalent of the flow resistances, this corresponding to only a modest fraction of the peripheral speed of the rotating body of liquid. The entire power requirements for the coolant circulation amount to only about one per cent of the rated power of the machine.

As mentioned, the rotor of the machine may be equipped with a squirrel-cage winding. In this case the short-circuited conductors of the winding are preferably equipped with flags or lug-shaped radial extensions 24 (Fig. 6) which, as illustrated, also provide the seating or function surfaces at which the winding is joined with the rotor housing 21. Between the inner surface of the housing 21 and the periphery of the stack of laminations 23 there remains a gap 26 of a few millimeters width along which the liquid can flow from the scoping to the discharging side of the machine. During the return flow, the cooling liquid passes along the above-mentioned lug shaped extensions 24 of the squirrel-cage windings and thus dissipates any heat losses of the winding not indirectly transmitted to the rotor housing through the stack of laminations.

For reducing the temperature gradient between the cooling liquid and the rotor housing, the inner surface of the housing 21 is enlarged by axial or radial ribs or projections. An especially simple way of obtaining such a surface enlargement consists in cutting a fine screw thread into the inner housing surface such as shown at 27 in Fig. 6.

The above-described liquid-cooled design of an electric motor permits achieving another aim of my invention. That is, by virtue of the increased utilization of the material now permissible because of the intensified cooling, the dimensions of the active machine portions may be reduced to such an extent that the entire machine unit can be accommodated within the diameter of a belt sheave of substantially the same size as conventionally used for the particular power rating of the machine. In other words, the rotor housing may then directly function as a belt sheave. This is possible even if the rotor housing is given a double-walled design with radial cooling fins between the two housing walls as described in the following.

The heat collected by the cooling liquid from the heat developing parts of the machine, i. e. mainly from the windings and the active iron, is dissipated to the ambient air through the exterior surface of the rotor housing. This surface, if necessary, may be artificially enlarged. A smooth rotating drum usually affords a satisfactory cooling effect because of its rotation. However, the heat dissipation from the entire machine unit may be considerably increased by providing the rotor with ribs or by giving the rotor housing a double-walled design with radial ribs or fins disposed between the two concentric housing shells, thus providing a multiplicity of ducts between the two housing shells through which a corresponding quantity of air is blown by fan means disposed at one axial side of the machine. According to another feature of the invention the exterior shell of a double-walled rotor housing and the pertaining radial fins may be arranged along only part of the axial housing length, thus arriving at a stepped belt sheave structure that permits taking two drive speeds from the same motor.

A modification of the rotor housing embodying the just mentioned features of the invention is illustrated in Figs. 8 and 9, the rest of the machine being in accordance with Fig. 6 or Fig. 11. The rotor housing according to Figs. 8 and 9 has an inner portion 31 and an outer portion 32, both interconnected by a large number of radial fins 33 which provide interstitial cooling channels parallel to the axis of the machine. The outer housing portion 32 forms a shell or jacket that extends over only about half the axial length of the entire housing, so that the resulting two peripheral outer surfaces are available as belt sheaves. The channels form between centrifugal fan blades 34 at the adjacent axial end of the machine. During rotation of the rotor housing, a flow of air is forced through the channels 34 and 33 to increase the heat dissipation from the entire unit, as explained in the foregoing.

Such machines, having the exterior appearance and function of a single or stepped belt sheave, are preferably journalled on an unilaterally mounted shaft so that the driving belt can readily be placed onto the belt sheave housing or be removed therefrom, especially in the case of transportable equipment. In such designs, the shaft traverses the housing at only one side of the machine so that any remaining sealing requirements are correspondingly minimized. The shaft may be held in a standard (not shown) which, having usually for reasons of mechanical strength a box shape or skeleton type design, may also be used for accommodating the switch or other accessory equipment of the motor.

With stationarily mounted machines a standard of the just mentioned type is usually unnecessary. In such cases, the machine shaft may be secured to a simple base plate (not shown) for attachment to a wall, unless the shaft stub can directly be screwed or otherwise secured to structural parts of a building.

The above-mentioned seal for preventing leakage of oil at the passage of the shaft through the rotor housing, is preferably secured hydrodynamically by a corresponding shaping of the housing portion surrounding the bore for the passage of the shaft. Such a seal is exemplified by Fig. 10. The rotor housing 36 is equipped with a gasket 37 to provide a seal against the stationary shaft 38 of the stator structure. The sealing duty of the gasket 37 is minimized by skirt-like projections 39 and 40 which are integral with the housing 36 and are given the hydrodynamically desirable shape and dimensions. It will be understood that only moderate requirements are imposed upon the shaft seal because this seal is not under liquid pressure during rotation of the machine. Also there may not be any direct contact between the main body of liquid and the shaft seal when the machine is stationarily mounted or in proper working position, because when the machine is at standstill the entire liquid may collect at the bottom of the rotor housing, having its level below the shaft seal.

As apparent from Fig. 10 in comparison with Fig. 5, the machines may be equipped with ordinary bearings or anti-friction bearings. In either case, the cooling liquid is preferably also utilized for lubricating the bearing.

For economy of material and space, the rotating housing is preferably adapted as closely as feasible to the electrodynamically active machine portions. This incurs the difficulty that the volume of the liquid, which during the machine operation forms the body of rotation, will reach above the lower horizontal level of the machine bore when the machine is at a standstill. Consequently, unless in such a design a perfect shaft seal is provided, there will be the danger of cooling liquid leaking through the seal. However, by correspondingly changing the axial length of the housing and by proper selection of the radial width of the annular liquid body, it is always possible to obtain conditions in which the liquid level at standstill remains below the bore of the rotor housing.

According to another feature of the invention, however, these conditions may be further improved by providing the machine with an axial extension whose inner diameter is smaller than the inner diameter of the annular liquid body existing during the rotation of the machine. Such an extension has the effect of providing for the cooling liquid a supplemental storage space which is in effect only when the machine is at standstill but does not retain substantial amounts of liquid when the machine is in operation. Such a storage extension may be designed as an additional belt sheave to further improve the versatility of the machine, for instance, as apparent from the embodiment illustrated in Fig. 11 and described presently.

The machine according to Fig. 11 has a stationary shaft 41 carrying a stator structure denoted as a whole by 42. The rotor structure is designed substantially in accordance with the above-described embodiment of Figs. 4 to 6. The rotor of the machine has an electrodynamically active portion 43 designed substantially also in accordance with Fig. 6. The rotor housing has a main portion 44 journalled on the shaft 41 by means of bearings 45, 46. Housing portion 44 fully encloses the stator structure substantially in the manner explained with reference to Fig. 6. However, this housing portion is surrounded along part of its axial length by a cylindrical jacket 45 of larger diameter which, corresponding to the outer housing portion 32 of the embodiment shown in Figs. 8 and 9, defines a peripheral cooling space subdivided by radial fins 47 and supplied with cooling air by means of fan blades 47'. The housing portions 44 and 45 form two sections of a stepped belt sheave. Attached to the housing portion 44 is a cylindrical housing portion 48 of smaller exterior diameter which forms a third sheave step. Hence, three different drive speeds can be taken from this unit. The interior space 49 of the housing portion 48 communicates with the interior of the main housing portion 44 through openings such as the one shown at 50.

As explained in the foregoing, the interior of the housing is provided with a quantity of cooling liquid such as oil. This quantity is so chosen that during machine operation the liquid forms a body of rotation within the housing portion 44. The inner diameter of this rotating body of liquid is larger than the inner diameter of the additional housing portion 48. Consequently, substantially the entire liquid is located within the main housing portion when the machine is in operation, and some of it is diverted through the stator structure by the two tubular members 51 and 52 in the manner described previously.

When the machine is at standstill so that the cooling liquid is collected at the bottom of the rotor housing structure, this liquid can enter into the space 49 within the housing portion 48. Consequently, the liquid level is now low enough to stay below the lowest point of the shaft 41 at the shaft seal 53. As a result, a very simple seal of negligible shaft friction is sufficient to prevent any leakage that might otherwise occur during starting and retarding periods or during transportation of the machine.

It will be obvious to those skilled in the art upon a study of this disclosure that machines according to my invention may be modified in various respects and may be given a design other than those specifically illustrated and described, without departing from the essential features of my invention and within the scope of the claims annexed hereto.

I claim:

1. A liquid-cooled rotary electric machine, comprising an internal stator and an external rotor, a liquid coolant enclosed in said rotor and forming in operation an annular body of rotation, said stator having passages and having two conduit means communicating with each other through said passages and having respective ends projecting into the space of said coolant body, said conduit ends having respective openings directed in the running direction and opposed thereto respectively, whereby said conduit means divert a flow of coolant from said body through said passages and back to said body.

2. In a machine according to claim 1, said passages extending through said stators generally parallel to its axial direction, and said two conduit means comprising respective tubular members disposed at axially opposite sides of said stator and projecting toward the inner periphery of said rotor.

3. A liquid-cooled rotary electric machine, comprising an internal stator and an external rotor, a liquid coolant enclosed in said rotor and forming in operation an annular body of rotation, said stator having a laminated magnetizable core and winding end turns at both axial sides of said core, stationary closure means joined with said core at said respective sides and forming respective chambers enclosing said end turns and communicating with each other, and two conduit members mounted on said closure means and communicating with said respective chambers, said conduit means extending into the space of said coolant body and having respective end openings in said space for passing coolant from said body through said chambers.

4. In a machine according to claim 3, said stator core having slots, stator windings disposed in said slots and forming interstitial gaps through which said two chambers communicate with each other.

5. In a machine according to claim 4, said stator having bypass duct means extending between said chambers to conduct a flow of coolant hydraulically parallel to that in said gaps.

6. A liquid-cooled rotary electric machine, comprising an internal stator and an external rotor, a liquid coolant enclosed in said rotor and forming in operation an annular body of rotation, said stator having passages and having duct means communicating with said passages and extending into the space of said body for conducting a flow of liquid through said passages, said rotor having a double-walled housing structure and forming a peripheral annular space open to ambient air, cooling fins disposed in said space and extending substantially parallel to the machine axis, and blower means disposed at an axial side of said rotor for passing cooling air through said space.

7. A liquid-cooled rotary electric machine, comprising an internal stator and an external rotor, a liquid coolant enclosed in said rotor and forming in operation an annular body of rotation, said stator having passages and having duct means communicating with said passages and extending into the space of said body for conducting a flow of liquid through said passages, said rotor having a double-wall housing portion extending from one axial rotor side over only part of the axial rotor length so as to leave a remaining rotor portion of smaller outer diameter than said double-wall portions, said two portions forming respective adjacent belt sheaves, said double wall portions forming an annular interstice open to ambient air, cooling fins disposed in said interstice and extending substantially parallel to the machine axis, and blower means disposed at an axial side of said rotor for passing cooling air through said interstice.

8. In a machine according to claim 7, said rotor comprising an additional belt-sheave portion adjacent to said remaining portion and having a smaller outer diameter than the latter, said additional portion having an interior communicating with that of said other portions so as to provide storage space for coolant when the machine is at standstill, said additional portion having an inner diameter smaller than that of said rotational body of coolant so as to be substantially free of coolant during machine operation.

9. A liquid-cooled rotary electric machine, comprising an internal stator and an external rotor, said rotor forming a housing around said stator and having an axial bore traversed by part of said stator, a quantity of cooling liquid enclosed in said housing and forming during rotation of said rotor an annular body of liquid having a free rotational liquid surface of a diameter larger than that of said bore, said stator having electric windings and having cooling passages in heat-exchanging proximity to said windings, and conduit means communicating with said passages and extending into the space of said body of liquid for diverting a flow of liquid from said body through said passages of said stator.

10. A liquid-cooled rotary electric machine, comprising a stationary shaft, a stator firmly mounted on said shaft and having a magnetizable structure and stator windings on said structure, a rotor revolvably mounted on said shaft and forming a housing enclosing said stator, said rotor having near said shaft an axial bore of a diameter smaller than the outer diameter of said stator, a quantity of cooling liquid enclosed in said housing and forming during rotation of said rotor an annular body of liquid having a free rotational liquid surface of a diameter larger than that of said bore, said stator having cooling passages extending through said magnetizable structure and along said windings, and conduit means on said stator and communicating with said passages and extending into the space of said body of liquid for conducting a flow of liquid through said passages.

11. In a machine according to claim 9, said housing formed by said rotor having inwardly projecting surface elements disposed at its inner periphery and engageable by said rotational body of liquid for increased dissipation of heat.

FRANZ GEYER.

References Cited in the file of this patent

UNITED STATES PATENTS

| Number | Name | Date |
|--------|------|------|
| 2,256,659 | Thrasher | Sept. 23, 1941 |

FOREIGN PATENTS

| Number | Country | Date |
|--------|---------|------|
| 727,531 | France | Mar. 29, 1932 |